(12) United States Patent
Brown et al.

(10) Patent No.: US 8,522,247 B2
(45) Date of Patent: Aug. 27, 2013

(54) SYSTEM AND METHOD FOR INDICATING USAGE OF SYSTEM RESOURCES USING TASKBAR GRAPHICS

(75) Inventors: Jeremy Ray Brown, Orem, UT (US); Jason Allen Sabin, Pleasant Grove, UT (US)

(73) Assignee: Novell Intellectual Property Holdings, Inc., Seattle, WA (US)

( * ) Notice: Subject to any disclaimer, the term of this patent is extended or adjusted under 35 U.S.C. 154(b) by 1326 days.

(21) Appl. No.: 11/830,534

(22) Filed: Jul. 30, 2007

(65) Prior Publication Data

US 2009/0037920 A1 Feb. 5, 2009

(51) Int. Cl.
*G06F 9/46* (2006.01)

(52) U.S. Cl.
USPC .......................................... 718/104; 715/779

(58) Field of Classification Search
None
See application file for complete search history.

(56) References Cited

U.S. PATENT DOCUMENTS

| | | | | |
|---|---|---|---|---|
| 2002/0057284 A1* | 5/2002 | Dalby et al. | ................ | 345/700 |
| 2003/0142141 A1* | 7/2003 | Brown et al. | ................ | 345/805 |
| 2003/0169294 A1* | 9/2003 | Vatula et al. | ................ | 345/764 |
| 2006/0123353 A1* | 6/2006 | Matthews et al. | ............ | 715/779 |
| 2007/0128899 A1* | 6/2007 | Mayer | ........................ | 439/152 |

* cited by examiner

*Primary Examiner* — Emerson Puente
*Assistant Examiner* — Paul Mills
(74) *Attorney, Agent, or Firm* — Marger Johnson & McCollom PC

(57) ABSTRACT

System and method for a method for indicating relative usage of a computer system resource by a plurality of applications each running in an active window, wherein each active window is represented on a taskbar element by a taskbar button, are described. In one embodiment, the method comprises, for each of the active windows, determining a resource usage rate for the application running in the active window, the resource usage rate comprising a percentage of a total system resource usage for which the application accounts; subsequent to the determining, ranking the applications in order of the determined resource usage rates thereof; and redisplaying the taskbar buttons to indicate, via at least one display characteristic, the relative system resource usage rates of the applications.

11 Claims, 1 Drawing Sheet

SYSTEM AND METHOD FOR INDICATING USAGE OF SYSTEM RESOURCES USING TASKBAR GRAPHICS

BACKGROUND

In personal computing, a "taskbar" is an element of the graphical user interface of Microsoft Windows and other graphical user interface environments. In Windows, the default location for the taskbar is across the bottom of the screen. Also by default, the Windows taskbar includes a Start menu, a Quick Launch bar, taskbar buttons, and a system tray.

In Windows, a taskbar button is added to the taskbar whenever an application creates a window that doesn't have a parent and that is created according to normal Windows user interface guidelines. Typically all single document interface applications will have a separate taskbar button for each open window. Modal windows may also have a taskbar button. When a window is closed, the taskbar button associated with that window is removed from the taskbar.

Each taskbar button indicates only the identity of a window associated therewith and provides means for easily accessing that window from any other window or the desktop display. No additional information regarding the associated window is evident from its taskbar button. The display characteristics (e.g., size, color, font) of each taskbar button is identical to those of the remaining taskbar buttons.

SUMMARY

One embodiment is a method for indicating relative usage of a computer system resource by a plurality of applications each running in an active window, window is represented on a taskbar element by a taskbar button. The method comprises, for each of the active windows, determining a resource usage rate for the application running in the active window, the resource usage rate comprising a percentage of a total system resource usage for which the application accounts; subsequent to the determining, ranking the applications in order of the determined resource usage rates thereof; and redisplaying the taskbar buttons to indicate, via at least one display characteristic, the relative system resource usage rates of the applications.

Another embodiment is a system for indicating relative usage of a computer resource by a plurality of applications each running in an active window, wherein each active window is represented on a taskbar element by a taskbar button. The system comprises means for determining, for each of the active windows, a resource usage rate for the application running in the active window, the resource usage rate comprising a percentage of a total computer resource usage for which the application accounts; means for ranking the applications in order of the determined resource usage rates thereof subsequent to the determining; and means for redisplaying the taskbar buttons to indicate, via at least one display characteristic, the relative computer resource usage rates of the applications.

Yet another embodiment is a computer program product for indicating relative usage of a computer system resource by a plurality of applications each running in an active window, wherein each active window is represented on a taskbar element by a taskbar button. The computer program product comprises a computer-readable medium having stored thereon computer executable instructions for, for each of the active windows, determining a resource usage rate for the application running in the active window, the resource usage rate comprising a percentage of a total system resource usage for which the application accounts; subsequent to the determining, ranking the applications in order of the determined resource usage rates thereof; and redisplaying the taskbar buttons to indicate, via at least one display characteristic, the relative system resource usage rates of the applications.

DETAILED DESCRIPTION

To better illustrate the advantages and features of the invention, a particular description of several embodiments will be provided with reference to the attached drawings. These drawings, and other embodiments described herein, only illustrate selected aspects of the invention and do not limit the invention's scope. Further, despite reference to specific features illustrated in the example embodiments, it will nevertheless be understood that these features are not essential to all embodiments and no limitation of the scope of the invention is thereby intended. Any alterations and further modifications in the described embodiments, and any further applications of the principles of the invention as described herein are contemplated as would normally occur to one skilled in the art. Furthermore, some items are shown in a simplified form, and inherently include components that are well known in the art. Further still, some items are illustrated as being in direct connection for the sake of simplicity and clarity. Despite the apparent direct connection, it is understood that such illustration does not preclude the existence of intermediate components not otherwise illustrated.

Figure 1:
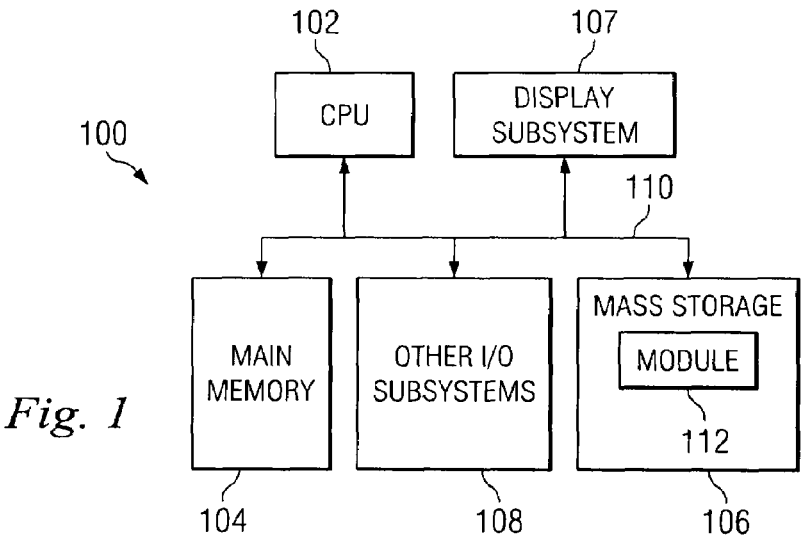
FIG. 1 is a block diagram of computer system in which an embodiment for indicating usage of system resources using taskbar graphics is implemented.

FIG. 1 is a block diagram of a conventional computer system 100 in which an embodiment for indicating usage of system resources using taskbar graphics is implemented. As shown in FIG. 1, the computer system 100 includes a central processing unit ("CPU") 102, main memory 104, mass storage 106, a display subsystem 107, and other I/O subsystems, collectively designated by reference numeral 108, all interconnected via one or more buses, collectively represented in FIG. 1 by a bus 110. In one embodiment, as will be described in greater detail herein, a module 112 comprising computer program instructions for implementing a system of one embodiment for indicating use of computer system resources via a taskbar is installed on the computer 100.

As will be described in greater detail below, in operation, the module 112 determines, for each active window, the amount of system resources, on a resource-by-resource basis, being used by the application running in the window. In particular, in one embodiment, the module 112 determines CPU usage and memory usage for each such application. It will be recognized that the module 112 may perform this task directly or may access this information from the operating system (not shown) of the computer 100. The module 112 further determines for what percentage of overall resource usage, on a resource-by-resource basis, each such application accounts and then adjusts one or more display characteristics of the taskbar button for each of the windows accordingly. For example, the size (i.e., length) of each taskbar button relative to the remaining taskbar buttons may indicate the usage rate of a first system resource (e.g., the CPU) for the application running in the window represented by the taskbar button relative to the CPU usage of applications running in windows represented by the remaining taskbar buttons. Additionally, or alternatively, the usage rate of a second system resource (e.g., the memory) may be represented by altering one or more other display characteristics (e.g., font size, button color, brightness) of the taskbar buttons.

In one embodiment, usage rates of multiple system resources, such as the CPU and the memory, may be indicated concurrently using different display characteristics; for example, button size may be used to indicate relative CPU usage, while font size may be used to indicate relative memory usage. In another embodiment, multiple resource usage rates for a single application may be combined in some predetermined manner, with the combined usage rate indicated by a single taskbar button display characteristic, such as button size. In yet another embodiment, a single taskbar button display characteristic may be used to indicate multiple recourse usage rates, with the user having the ability to select which resource rate is to be displayed at a given time.

Figure 2:
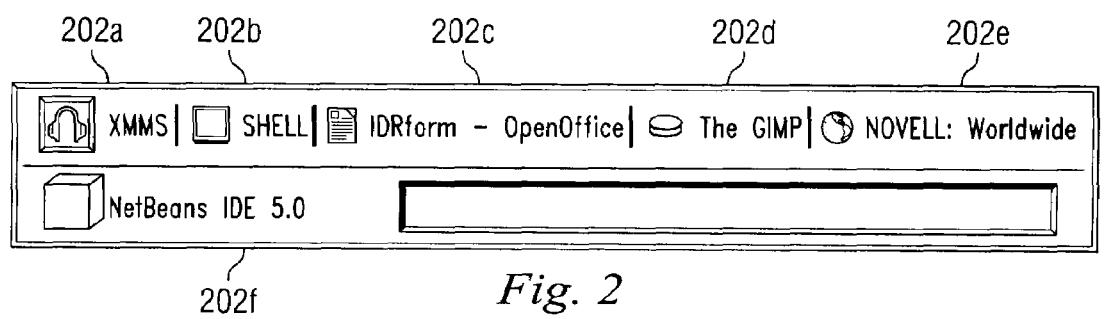
FIG. 2 illustrates a taskbar of a computer system such as the computer system of FIG. 1 in which an embodiment for indicating usage of system resources using taskbar graphics is implemented.

FIG. 2 illustrates an example of a display of a system for indicating usage of system resources using taskbar graphics in accordance with one embodiment. As shown in FIG. 2, a taskbar 200 of an embodiment includes six taskbar buttons 202a-202f, each of which corresponds to an active window in which an application is running. In the embodiment illustrated in FIG. 2, the relative usage rates of a particular system resource or combination of resources by each of the applications running in the windows associated with the taskbar buttons 202a-202f is indicated by the length of the buttons. For example, as shown in FIG. 2, the application running in the window associated with the taskbar button 202f accounts for the greatest percentage of overall system resource usage (i.e., has the highest system resource usage rate), while the application running in the window associated with the taskbar button 202b accounts for the lowest percentage of overall system resource usage (i.e., has the lowest system resource usage rate). It will be recognized that, as previously described, a different display characteristic may be used to indicate relative system resource usage rates.

Figure 3:
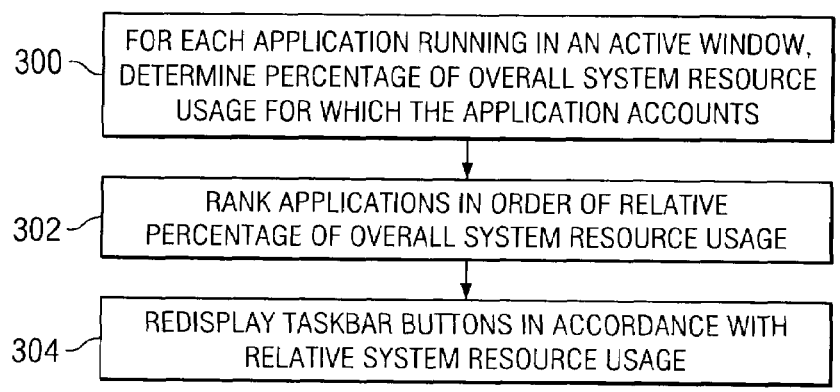
FIG. 3 is a flowchart illustrating operation of an embodiment for indicating usage of system resources using taskbar graphics.

FIG. 3 is a flowchart illustrating one embodiment of a method for indicating usage of system resources using taskbar graphics. In particular, the process illustrated in FIG. 3 is performed periodically throughout operation of the computer on which the system is installed. In step 300, for each application running in a window with which a taskbar button is associated, a determination is made as to what percentage of the overall usage rate the application accounts for. As previously noted, this determination may be made with respect to each of one or more system resources, such as CPU and/or system memory. In step 302, the applications are ranked in order of relative percentage of overall system resource usage. In step 304, the taskbar buttons are redisplayed to indicate, using one or more display characteristics, the relative system resource usage rates of the corresponding applications.

While the preceding description shows and describes one or more embodiments, it will be understood by those skilled in the art that various changes in form and detail may be made therein without departing from the spirit and scope of the present disclosure. For example, various steps of the described methods may be executed in a different order or executed sequentially, combined, further divided, replaced with alternate steps, or removed entirely. In addition, various functions illustrated in the methods or described elsewhere in the disclosure may be combined to provide additional and/or alternate functions. Therefore, the claims should be interpreted in a broad manner, consistent with the present disclosure.

What is claimed is:

1. A method for indicating relative usage of multiple system resources of a computer system for a plurality of applications each running in a separate active window displayed in a graphical user interface (GUI) of the computer system, wherein each active window is represented on a taskbar element of the GUI by a separate taskbar button, the method comprising:

determining, for each of the active windows, a resource usage rate of the application running in the active window for each of the multiple system resources, wherein each of the resource usage rates comprises a percentage of a total system resource usage for which the application accounts;

ranking, for each of the multiple system resources, the applications in order of their respectively determined resource usage rates to create a relative usage ranking of the applications for the system resource;

selecting, for each of the relative usage rankings, a corresponding relative display characteristic, wherein each relative display characteristic is selected from a set consisting of relative taskbar button size, relative taskbar button font color, and relative taskbar button font size, and wherein a different relative display characteristic is selected from the set for each relative usage ranking; and redisplaying the taskbar buttons with the selected relative display characteristics concurrently altered to respectively indicate the corresponding relative usage rankings of the applications running in the active windows represented by the redisplayed taskbar buttons.

2. The method of claim 1 wherein the computer system resources include a CPU.

3. The method of claim 1 wherein the computer system resources include system memory.

4. A computer system for indicating relative usage of multiple computer system resources for applications comprising:

a central processing unit (CPU);

means for displaying a graphical user interface (GUI);

a memory storing computer-readable instructions which, when executed by the CPU, cause the computer system to perform a method comprising:

executing a plurality of applications on the computer system, each application running in a separate active window displayed in the GUI, wherein each active window is represented on a taskbar element of the GUI by a separate taskbar button;

determining, for each of the active windows, a resource usage rate of the application running in the active window for each of multiple system resources of the computer system, wherein each of the resource usage rates comprises a percentage of a total system resource usage for which the application accounts;

ranking, for each of the multiple system resources, the applications in order of their respectively determined resource usage rates to determine each application's relative usage rank for the system resource; and redisplaying each taskbar button with multiple relative display characteristics altered to concurrently indicate the relative usage ranks of the application running in the active window represented by the taskbar button, wherein each of the multiple relative display characteristics is drawn from a set consisting of relative size of the taskbar buttons, relative font color of the taskbar buttons, and relative font size of the taskbar buttons, and wherein each altered relative display characteristic corresponds to one relative usage ranking.

5. The system of claim 4 wherein the computer resources include a CPU.

6. The system of claim 4 wherein the computer resources include a system memory.

7. A non-transitory computer-readable medium having stored thereon computer executable instructions which, when executed by a processor, causes the processor to implement a method for indicating relative usage of multiple system resources of a computer system for a plurality of applications each running in a separate active window displayed in a graphical user interface (GUI) of the computer system, wherein each active window is represented on a taskbar element of the GUI by a separate taskbar button, the method comprising:

determining, for each of the active windows, a resource usage rate of the application running in the active window for each of the multiple system resources, wherein each of the resource usage rates comprises a percentage of a total system resource usage for which the application accounts;

ranking, for each of the multiple system resources, the applications in order of their respectively determined resource usage rates to create a relative usage ranking of the applications for the system resource;

selecting, for each of the relative usage rankings, a corresponding relative display characteristic, wherein each relative display characteristic is selected from a set consisting of relative taskbar button size, relative taskbar button font color, and relative taskbar button font size, and wherein a different relative display characteristic is selected from the set for each relative usage ranking; and redisplaying the taskbar buttons with the selected relative display characteristics concurrently altered to respectively indicate the corresponding relative usage rankings of the applications running in the active windows represented by the redisplayed taskbar buttons.

8. The non-transitory computer program product of claim 7 wherein the computer system resources include at least one of a CPU and system memory.

9. The method of claim 1, wherein selecting the corresponding relative display characteristics further comprises selecting relative display characteristics from the set which alter a common feature of the taskbar button.

10. The system of claim 4, wherein selecting the corresponding relative display characteristics further comprises selecting relative display characteristics from the set which alter a common feature of the taskbar button.

11. The non-transitory computer-readable medium of claim 7, wherein selecting the corresponding relative display characteristics further comprises selecting relative display characteristics from the set which alter a common feature of the taskbar button.

\* \* \* \* \*